United States Patent
Otsuki et al.

[11] Patent Number: 5,475,602
[45] Date of Patent: Dec. 12, 1995

[54] ACCELERATION CONSTANT SWITCHING APPARATUS

[75] Inventors: Toshiaki Otsuki; Haruhiko Kozai; Masahiko Miyake, all of Minamitsuru, Japan

[73] Assignee: Fanuc Ltd., Yamanashi, Japan

[21] Appl. No.: 244,454

[22] PCT Filed: Oct. 7, 1993

[86] PCT No.: PCT/JP93/01450

§ 371 Date: Jun. 2, 1994

§ 102(e) Date: Jun. 2, 1994

[87] PCT Pub. No.: WO94/09421

PCT Pub. Date: Apr. 28, 1994

[30] Foreign Application Priority Data

Oct. 15, 1992 [JP] Japan ..................................... 4-276882

[51] Int. Cl.$^6$ ..................... G05B 19/416; G05B 19/4103
[52] U.S. Cl. ................................ 364/474.31; 364/474.3; 318/573
[58] Field of Search .................. 364/474.3, 474.31, 364/474.28, 474.29, 474.12; 318/569, 571, 573, 600, 603, 570, 567, 568.1

[56] References Cited

U.S. PATENT DOCUMENTS

| 4,757,457 | 7/1988 | Matsumoto | 364/474.31 |
| 5,155,424 | 10/1992 | Sasaki et al. | 318/569 |
| 5,218,281 | 6/1993 | Sasaki et al. | 318/600 |

FOREIGN PATENT DOCUMENTS

| 61-159391 | 7/1986 | Japan | |
| 61-14948 | 9/1986 | Japan | 364/474.3 |
| 62-241010 | 10/1987 | Japan | |
| 63-253408 | 10/1988 | Japan | |
| 3-28908 | 2/1991 | Japan | |
| 3-152604 | 6/1991 | Japan | 364/474.31 |
| 3-219306 | 9/1991 | Japan | 364/474.31 |

Primary Examiner—Roy N. Envall, Jr.
Assistant Examiner—Steven R. Garland
Attorney, Agent, or Firm—Staas & Halsey

[57] ABSTRACT

A computerized numerical control apparatus for switching an acceleration constant for acceleration/deceleration prior to interpolation in accordance with the kind of an axis, in which an acceleration/deceleration prior to interpolation unit subjects a feed speed to an acceleration/deceleration process based on an acceleration constant designated by an acceleration constant switching unit. The feed speed subjected to the acceleration/deceleration process is transferred to an interpolation unit. The interpolation unit determines distribution pulses $X_p$, $Y_p$, $Z_p$ based on the speed data and movement data thereof. The distribution pulses are applied to an X-axis control unit and the like, respectively, and output to the respective axis motors $M_x$ and the like to execute the drive control thereof. On the other hand, a commanded axis recognition unit recognizes the kind of an axis commanded in a next block and the acceleration constant switching unit switches an acceleration constant in accordance with the kind of the axis. For example, when only an X-axis or Y-axis or both X- and Y- axes are used as the kind of an axis, an acceleration constant TA is selected, whereas when a Z-axis is included in the kind of the axis, an acceleration constant TB is selected. In this case, the acceleration constant TA is set to a value larger than the acceleration constant TB.

1 Claim, 4 Drawing Sheets

ACCELERATION CONSTANT SWITCHING APPARATUS

FIELD OF THE PRESENT INVENTION

The present invention relates to an acceleration constant switching apparatus for switching an acceleration constant for acceleration/deceleration prior to interpolation in a computerized numerical control apparatus.

DESCRIPTION OF THE RELATED ART

Numerical control apparatuses conventionally have only one kind of an acceleration constant for acceleration/deceleration prior to interpolation. Further the acceleration constant is set to the value of the axis which must have a smallest acceleration constant among axes which may be interpolated at the same time.

For example, when an X-axis, Y-axis and Z-axis are to be interpolated, an acceleration constant of the Z-axis must be set to the smallest possible value because a spindle head is mounted thereon. Acceleration constants of the other X and Y-axes are also set equally to this small value in accordance with the acceleration constant of the Z-axis.

Therefore, even if an axis to be interpolated may have an acceleration constant which can be set to a larger value, the above small value is applied to it. As a result, a time required to accelerate and decelerate the axes is increased and a machining time is also increased accordingly.

SUMMARY OF THE PRESENT INVENTION

Taking the above into consideration, an object of the present invention is to provide an acceleration constant switching apparatus capable of selecting and switching an acceleration constant in accordance with the kind of an axis.

To attain the above object, according to the present invention, there is provided an acceleration constant switching apparatus for switching an acceleration constant for acceleration/deceleration prior to interpolation in a computerized numerical control apparatus. The acceleration constant switching apparatus comprises a commanded axis recognition unit for recognizing the kind of an axis commanded in the block of a machining program to be executed next and an acceleration constant switching unit for switching the acceleration constant for acceleration/deceleration prior to interpolation in accordance with the kind of the axis recognized by the commanded axis recognition unit.

The commanded axis recognition unit recognizes the kind of an axis designated in the block of a machining program to be executed next. The acceleration constant switching unit selects an acceleration constant for acceleration/deceleration prior to interpolation in accordance with the kind of an axis recognized by the commanded axis recognition unit and switches a previous acceleration constant to the selected acceleration constant. Therefore, an optimum acceleration constant can be applied in accordance with the kind of the axis. As a result, a time needed for the accelerating/decelerating operation of the axis can be reduced and a machining time can be also reduced accordingly.

DESCRIPTION OF THE PREFERRED EMBODIMENTS

An embodiment of the present invention will be described below with reference to the drawings.

Figure 1:
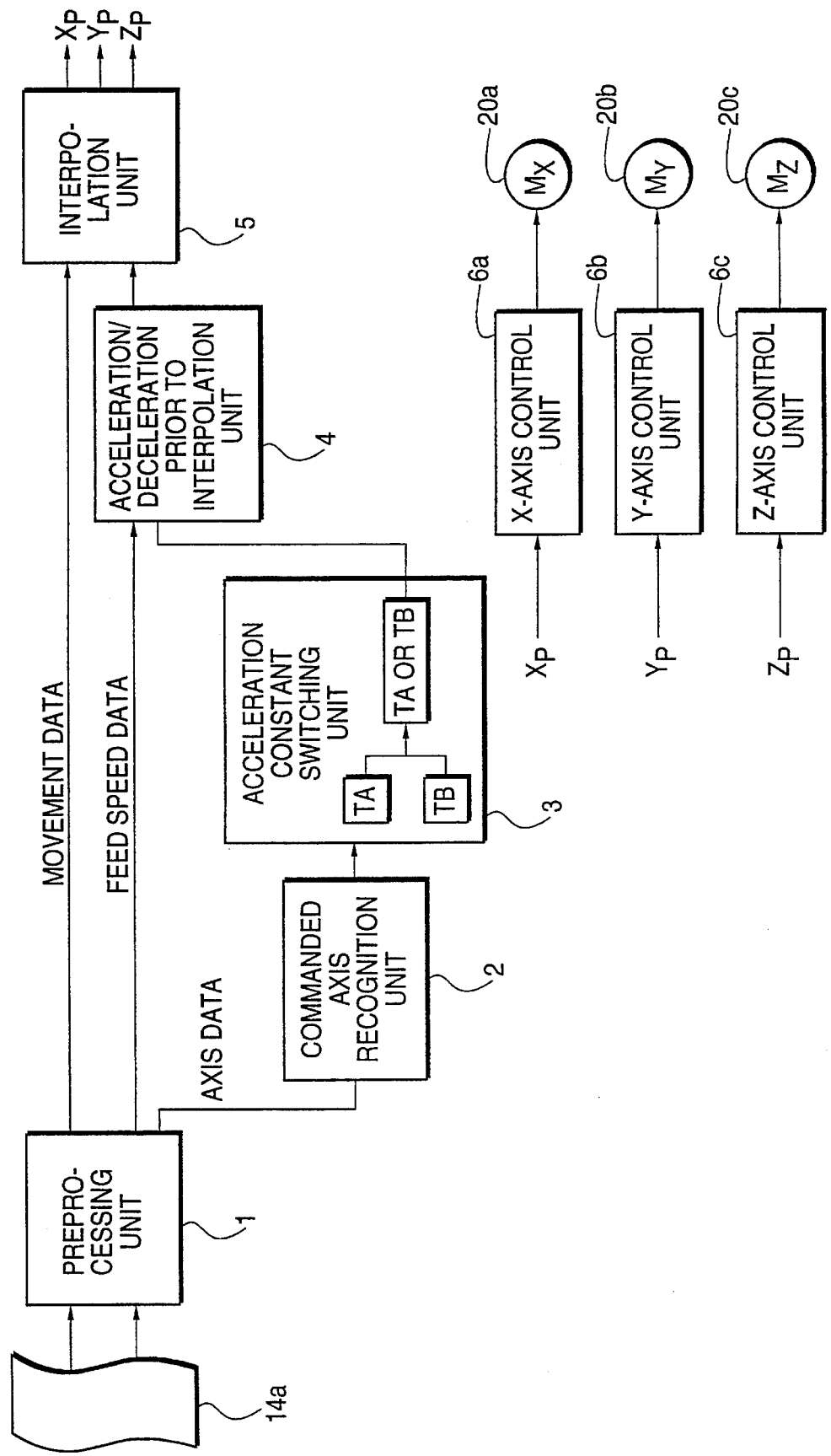
FIG. 1 is a diagram showing an entire arrangement of an acceleration constant switching apparatus of the present invention.

FIG. 1 is a diagram showing an entire arrangement of an acceleration constant switching apparatus, wherein a preprocess unit 1 of a computerized numerical control apparatus reads a machining program 14a and transfers movement data in the read data to an interpolation unit 5, feed speed data therein to acceleration/deceleration prior to an interpolation unit 4 and axis data therein to a commanded axis recognition unit 2, respectively.

The acceleration/deceleration prior to interpolation unit 4 subjects a feed speed to an acceleration/deceleration process. The acceleration/deceleration process is carried out based on an acceleration constant designated by an acceleration constant switching unit 3. The designation of the acceleration constant will be described later in detail. The feed speed subjected to the acceleration/deceleration process is transferred to the interpolation unit 5 as speed data which is, for example, linearly accelerated/decelerated. The interpolation unit 5 determines pulses $X_p$, $Y_p$, $Z_p$ to be distributed to the X-axis Y-axis and Z-axis, respectively, based on the speed data and the movement data supplied from the pre-processing unit 1. The distributed pulses $X_p$, $Y_p$, and $Z_p$ are supplied to a X-axis control unit 6a, Y-axis control unit 6b and a Z-axis control unit 6c, respectively, and are output to the motors $M_x$, $M_y$, $M_z$ of the respective axes of a machine tool to drive the motors.

On the other hand, the commanded axis recognition unit 2 recognizes the kind of an axis designated in a next block based on the axis data supplied from the preprocessing unit 1. The acceleration constant switching unit 3 switches an acceleration constant in accordance with the kind of the axis. More specifically, two kinds of acceleration constants TA, TB are preset in a memory in accordance with the kind of axes and the acceleration constant switching unit 3 selects one of the acceleration constants TA and TB which is suitable for the kind of the designated axis and switches a previous acceleration constant to the selected one and supplies the selected acceleration constant to the acceleration/deceleration prior to interpolation unit 4.

For example, when only the X-axis or Y-axis or both X- and Y-axes are used as the kind of an axis, the acceleration constant TA is selected, whereas when the Z-axis is included in the kind of the axis, the acceleration constant TB is selected. In this case, the acceleration constant TA is set to a value greater than the acceleration constant TB.

The aforesaid acceleration constant switching operation will be described below based on an actual example. First, it is assumed that the following machining program is read by the preprocessing unit 1.

N01 G01 G91 X-100. Y100. F1000;
N02 Z200.;
M30;

Further, it is assumed that acceleration constant TA =800

(mm/min$^2$) and acceleration constant TB =500 (mm/min$^2$) are set in the memory.

Since the X- and Y-axes are designated in the block N1 of this example, the acceleration constant switching unit 3 selects the acceleration constant TA having a larger value. Next, since a command for the Z-axis is included in the next block N2, the acceleration constant switching unit 3 selects the acceleration constant TB having a smaller value.

Figure 2:
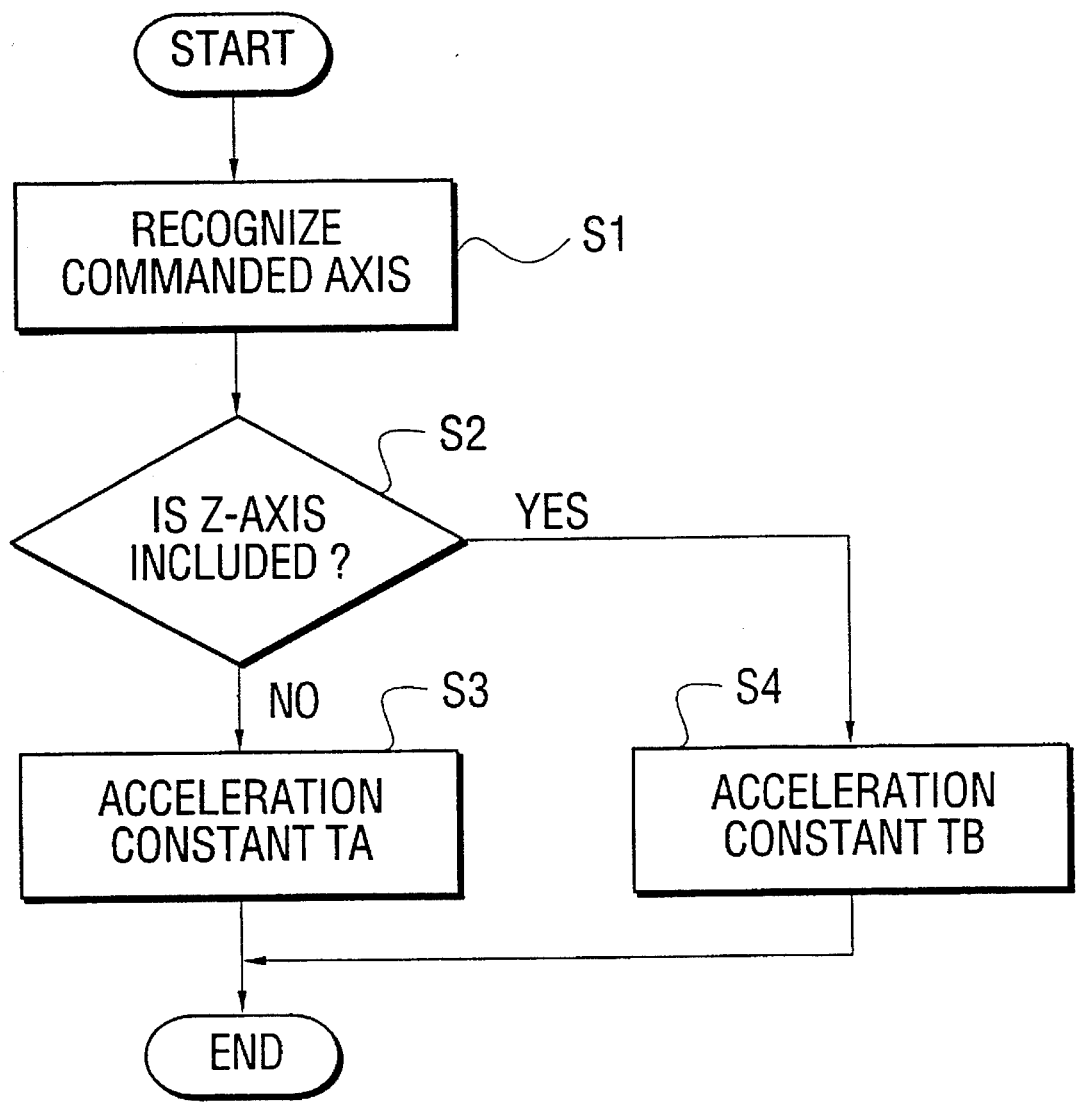
FIG. 2 is a flowchart for operating the acceleration constant switching apparatus of the present invention.

FIG. 2 is a flowchart for operating the acceleration constant switching apparatus of the present invention, wherein numerals prefixed with an "S" indicate the numbers of steps of the process.

[S1] The kind of a designated axis is recognized.

[S2] Whether the Z-axis is included or not is determined. If the Z-axis is included, the process goes to step S4, and if not, the process goes to step S3, respectively.

[S3] The acceleration constant TA having the larger value is selected and switched.

[S4] The acceleration constant TB having the smaller value is selected and switched.

As described above, when the Z-axis is not included, the acceleration constant is switched to the larger value. Therefore, an optimum acceleration constant can be applied in accordance with the kind of the axis. As a result, a time needed for the accelerating/decelerating operation of the axis can be reduced and a machining time can be also reduced accordingly.

Note, although the two kinds of the acceleration constants are set in the above description, the acceleration constant is not limited to these two kinds but a plurality of kinds of acceleration constants may be set, when necessary. For example, three kinds of acceleration constants may be set to each of the X-axis, Y-axis and Z-axis.

Further, although the acceleration constant is switched depending upon whether the Z-axis is included or not, it may be switched based on other reference regardless of the Z-axis.

Figure 3:
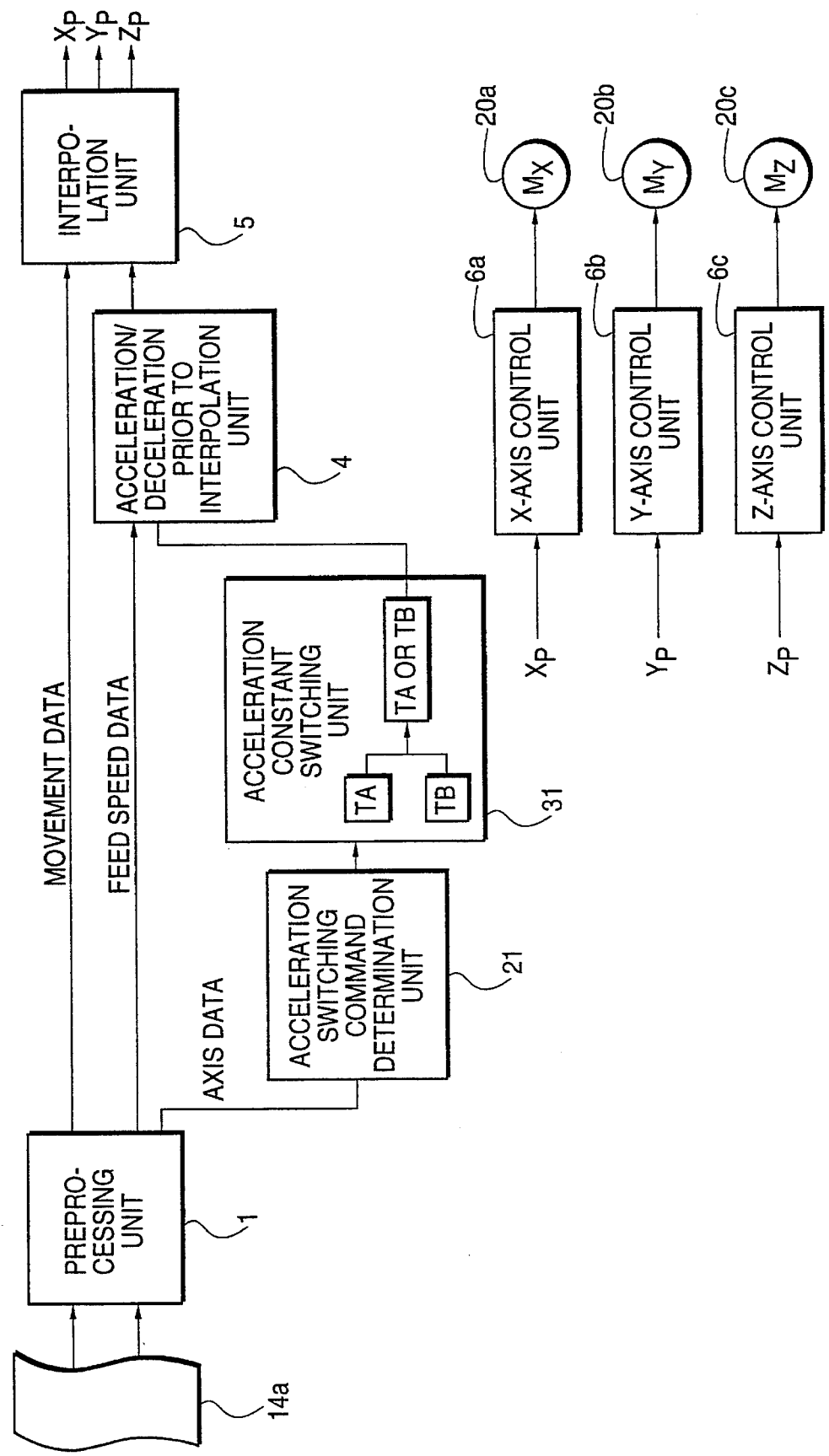
FIG. 3 is a diagram showing a second embodiment of the present invention.

FIG. 3 is a diagram showing a second embodiment of the present invention. The second embodiment is different from the first embodiment in that an acceleration switching command determination unit 21 is provided in place of the commanded axis recognition unit 2. The acceleration switching command determination unit 21 determines whether or not an acceleration constant switching command exists in a block to be executed next. When the command exists therein, an acceleration constant switching unit 31 switches a previous acceleration constant to an acceleration constant designated by the command.

The aforesaid acceleration constant switching operation will be described below based on an actual example. First, it is assumed that the following machining program is read by the preprocessing unit 1.

N01 G01 G91 X-100. Y100. F1000 M50;

N02 Z200. M51;

M30;

Further, it is assumed that acceleration constant TA =800 (mm/min$^2$) and acceleration constant TB =500 (mm/min$^2$) are set in the memory and that the acceleration constant TA is used in response to the M50 command and the acceleration constant TB is used in response to the M51 command.

Since the M50 command is included in the block N1 of this example, the acceleration constant TA is used, whereas since the M51 command is included in the next block N2, the acceleration constant TB is used. As described above, according to this embodiment, the acceleration constant can be switched by a programmed command.

Figure 4:
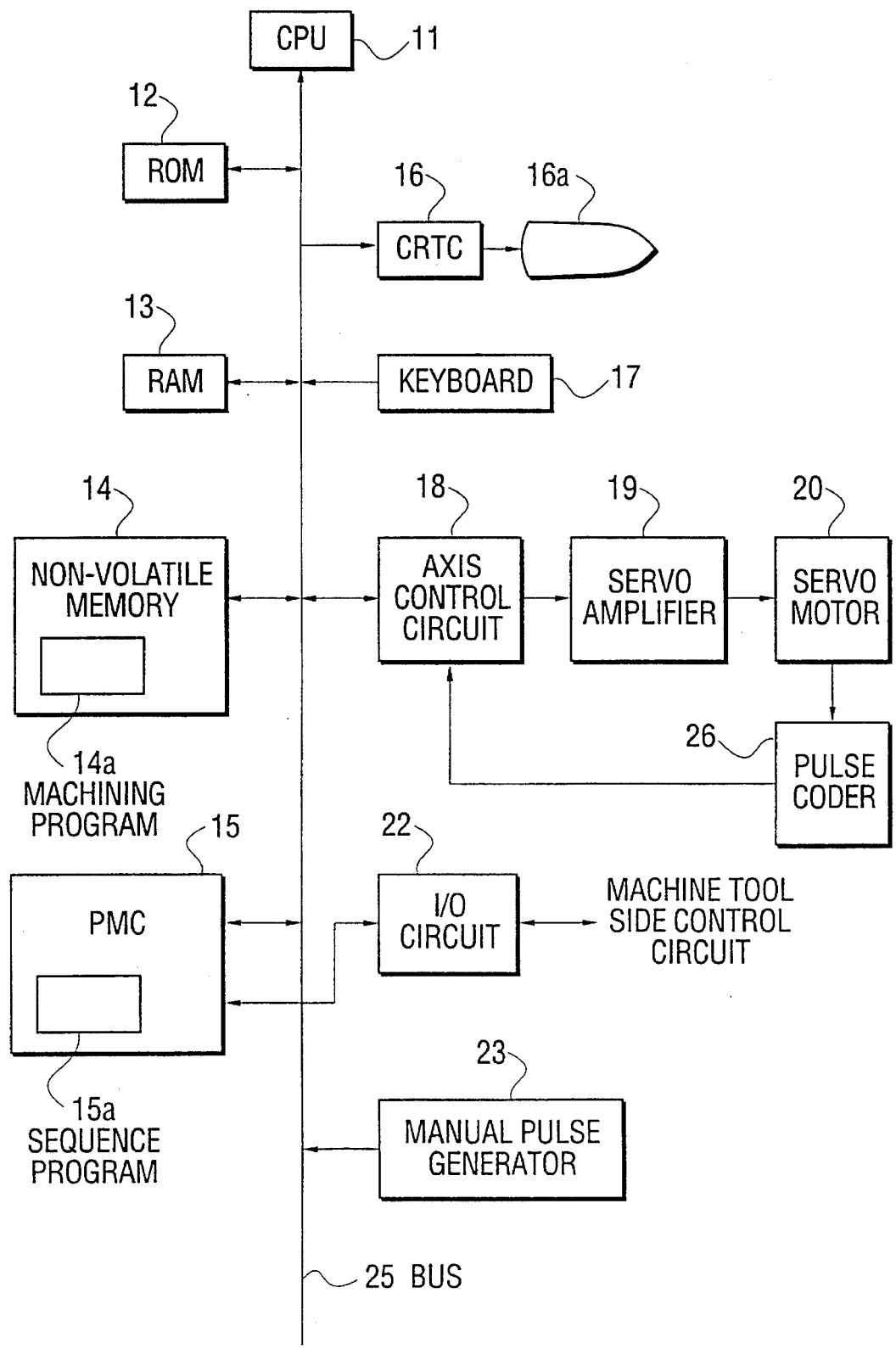
FIG. 4 is a block diagram of hardware showing an entire arrangement of a computerized numerical control apparatus (CNC) to which the present invention is applied.

FIG. 4 is a block diagram of hardware showing an entire arrangement of a computerized numerical control apparatus (CNC) to which the present invention is applied. A processor 11 controls the computerized numerical control apparatus as a whole in accordance with a system program stored in a ROM 12. Further, the respective functions of the preprocessing unit 1, the acceleration/deceleration prior to interpolation unit 4, the interpolation unit 5, the commanded axis recognition unit 2, the acceleration switching command determination unit 21 and the acceleration constant switching unit 3, are set to the processor 11, which executes the acceleration constant switching operation, as described above. An EPROM or EEPROM is used as the ROM 12. A RAM 13 comprises a DRAM in which various data is stored. A non-volatile memory 14 stores machining programs 14a, parameters and the like. Since the non-volatile memory comprises of a CMOS and the like to which power is supplied from a battery, the content of the data stored therein is maintained operative even after a power supply to the computerized numerical control apparatus is cut off. Further, the non-volatile memory 14 also stores parameters such as the above acceleration constants TA, TB and the like.

A programmable machine controller (hereinafter, referred to as PMC) 15 receives commands such as an M function, S function, T function and the like, interprets them by use of a sequence program 15a and outputs signals for controlling a machine tool. Further, the PMC 15 receives limit switch signals from the machine tool or switch signals from a machine control panel, processes them by use of the sequence program 15a, and outputs signals for controlling the machine tool. Further, signals needed by the computerized numerical control apparatus is transferred to the RAM 13 through a bus 25 and read by the processor 11.

A graphic control circuit 16 converts data stored in the RAM 13 such as the present positions, amounts of movement and the like of the respective axes into display signals, which are transferred to a display unit 16a and displayed thereon. A CRT, liquid crystal display and the like are used as the display unit 16a. A keyboard 17 is used to input various data.

An axis control circuit 18 receives a position command from the processor 11 and outputs speed command signals for controlling a servo motor 20 to a servo amplifier 19. The servo amplifier 19 amplifies these speed command signals and controls the servo motor 20. The above X-axis control unit 6a and the like correspond to the axis control circuit 18 and servo amplifier 19. A pulse coder 26 for outputting position feedback signals is connected to the servo motor 20. The pulse coder 26 feeds back position control pulses to the axis control circuit 18. A position detector such as a linear scale and the like may be used in addition to the pulse coder 26. Note, these elements are provided in accordance with the number of shafts, but only the elements for a single axis are shown here, because the respective elements has the same arrangement.

An I/O circuit 22 transfers I/O signals to and receives the same from the machine tool. More specifically, the I/O circuit 22 receives the limit switch signals from the machine tool and the switch signals from the machine control panel and these signals are read by the PMC 15. Further, the I/O circuit 22 receives output signals for controlling the pneumatic actuators and the like of the machine tool from the PMC 15 and outputs the same to the machine tool.

A manual pulse generator 23 is used to output a pulse train for precisely moving the respective axes in accordance with a rotational angle to thereby precisely position a machine position. The manual pulse generator 23 is usually mounted on the machine control panel.

A spindle control circuit, spindle amplifier, spindle motor and the like for controlling a spindle are omitted in FIG. 4.

Further, the only one processor is used here, a multi-processor system using a plurality of processors may be employed depending upon a system.

As described above, according to the present invention, since the acceleration constants for acceleration/deceleration prior to interpolation can be selectively switched in accordance with the kind of an axis, an optimum acceleration constant can be applied in accordance with the kind of the axis. As a result, a time necessary for the accelerating/decelerating operation of an axis can be reduced and a machining time can be also reduced accordingly.

We claim:

1. An acceleration constant switching apparatus, executing a machining program, for switching an acceleration constant for acceleration/deceleration prior to interpolation in a computerized numerical control apparatus, said acceleration constant switching apparatus comprising:

commanded axis recognition means for determining whether an axis having a type indicated in one of blocks of the machining program being executed next is a first type, a second type, or a third type; and acceleration constant switching means for switching the acceleration constant for acceleration/deceleration prior to the interpolation in accordance with the type of the axis determined by said commanded axis recognition means.

* * * * *